United States Patent
Guo et al.

(10) Patent No.: US 12,424,811 B2
(45) Date of Patent: Sep. 23, 2025

(54) OPTICAL AMPLIFICATION APPARATUS, AND MODE DIVISION MULTIPLEXING SYSTEM INCLUDING OPTICAL AMPLIFICATION APPARATUS

(71) Applicant: HUAWEI TECHNOLOGIES CO., LTD., Guangdong (CN)

(72) Inventors: Qiang Guo, Shenzhen (CN); Rui Zhou, Shenzhen (CN); Zhiqun Yang, Tianjin (CN); Tao Xu, Tianjin (CN); Yaping Liu, Tianjin (CN); Lin Zhang, Tianjin (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 305 days.

(21) Appl. No.: 18/332,130

(22) Filed: Jun. 9, 2023

(65) Prior Publication Data

US 2023/0318733 A1   Oct. 5, 2023

Related U.S. Application Data

(63) Continuation of application No. PCT/CN2021/137097, filed on Dec. 10, 2021.

(30) Foreign Application Priority Data

Dec. 11, 2020   (CN) .......................... 202011442785.X

(51) Int. Cl.
*H04B 10/293*   (2013.01)
*G02B 6/14*   (2006.01)
*H01S 3/067*   (2006.01)
*H01S 3/094*   (2006.01)
*H01S 3/10*   (2006.01)
*H01S 3/16*   (2006.01)
*H04B 10/2581*   (2013.01)
*H04J 14/04*   (2006.01)

(52) U.S. Cl.
CPC .......... *H01S 3/094011* (2013.01); *G02B 6/14* (2013.01); *H01S 3/06758* (2013.01);
(Continued)

(58) Field of Classification Search
CPC .............. H04B 10/2581; H04B 10/293; H04B 10/2935; H04J 14/04; H01S 3/10023; G02B 6/14
(Continued)

(56) References Cited

U.S. PATENT DOCUMENTS

2015/0003772 A1* 1/2015 Lionello ................ H01S 3/0675
  385/28
2015/0192733 A1* 7/2015 Abedin .............. G02B 6/02071
  385/28
(Continued)

FOREIGN PATENT DOCUMENTS

CN   109802289 A   5/2019
CN   111722320 A   9/2020
(Continued)

OTHER PUBLICATIONS

Masaki Wada et al: "Low mode dependent gain few-mode EDFA with fiber based mode scrambler", OECC/PSC 2019, Jul. 7-11, 2019 (Year: 2019).*
(Continued)

*Primary Examiner* — Li Liu
(74) *Attorney, Agent, or Firm* — Rimon PC

(57) ABSTRACT

Embodiments of an optical amplification apparatus are disclosed which include a first optical amplifier, a second optical amplifier, and a mode exchanger. The first optical amplifier is connected to an input port of the mode exchanger, and the second optical amplifier is connected to an output port of the mode exchanger. The first optical amplifier is configured to amplify optical signals carried in a plurality of transmission modes of a few-mode fiber, the plurality of transmission modes of the few-mode fiber may be grouped into N groups, each group includes two transmission modes, and N is a positive integer greater than or equal to 1. The mode exchanger is configured to exchange
(Continued)

the two transmission modes carrying optical signals in each group. The second optical amplifier is configured to amplify the optical signals that are carried in the two transmission modes in each group and whose modes are exchanged.

18 Claims, 4 Drawing Sheets

(52) U.S. Cl.
CPC ...... *H01S 3/10007* (2013.01); *H01S 3/10023* (2013.01); *H01S 3/1608* (2013.01); *H04B 10/2581* (2013.01); *H04B 10/293* (2013.01); *H04B 10/2931* (2013.01); *H04B 10/2935* (2013.01); *H04B 10/2939* (2013.01); *H04J 14/04* (2013.01)

(58) Field of Classification Search
USPC ..................................... 398/38, 44, 160, 180
See application file for complete search history.

(56) References Cited

U.S. PATENT DOCUMENTS

2017/0331553 A1* 11/2017 Amhoud .............. H04B 7/0456
2021/0296847 A1*  9/2021 Mizuno .................... H01S 3/30

FOREIGN PATENT DOCUMENTS

| JP | 2012533915 | A |   | 12/2012 |
|----|------------|---|---|---------|
| JP | 2014527301 | A |   | 10/2014 |
| JP | 2015026742 | A | * | 2/2015  |
| JP | 2018006474 | A |   | 1/2018  |
| JP | 2019530381 | A |   | 10/2019 |
| WO | 2020013096 | A1 |  | 1/2020  |
| WO | 2020102020 | A1 |  | 5/2020  |

OTHER PUBLICATIONS

Neng Bai et al:"Multimode Fiber Amplifier with Tunable Modal Gain Using a Reconfigurable Multimode Pump", Oct. 9-13, 2011, total 2 pages.

Hirotaka Ono et al:"2-LP mode few-mode fiber amplifier employing ring-core erbium-doped fiber",Oct. 19, 2015;23(21):27405-18, total 14 pages.

Qiongyue Kang et al:"Accurate modal gain control in a multimode erbium doped fiber amplifier incorporating ring doping and a simple LP01 pump configuration", Sep. 10, 2012, vol. 20, No. 19, Optics Express 20835, total 9 pages.

M. Wada et al:"Core-pumped 10-mode EDFA with Cascaded EDF Configuration",Sep. 18-22, 2016, total 3 pages.

Masaki Wada et al:"Low mode dependent gain few-mode EDFA with fiber based mode scrambler",OECC/PSC 2019, Jul. 7-11, 2019, total 3 pages.

* cited by examiner

OPTICAL AMPLIFICATION APPARATUS, AND MODE DIVISION MULTIPLEXING SYSTEM INCLUDING OPTICAL AMPLIFICATION APPARATUS

CROSS-REFERENCE TO RELATED APPLICATIONS

This application is a continuation of International Application No. PCT/CN2021/137097, filed on Dec. 10, 2021, which claims priority to Chinese Patent Application No. 202011442785.X, filed on Dec. 11, 2020. The disclosures of the aforementioned applications are hereby incorporated by reference in their entireties.

TECHNICAL FIELD

This application generally relates to the optical communication field and is applied to a mode division multiplexing optical transmission system, and in particular, relates to an optical amplification apparatus and a mode division multiplexing system including an optical amplification apparatus.

BACKGROUND

In an optical network, an optical signal may usually need to be amplified due to an optical power loss, so that the optical signal has sufficient power and performance so that it may be received by a receiver. For example, an erbium-doped fiber amplifier (EDFA) may be usually used to amplify the optical signal.

In an actual application, both an erbium ion doping manner of the erbium-doped fiber amplifier and a light field distribution in a pump mode may affect the amplification of the optical signal. In a few-mode fiber, a plurality of optical signals that are input into a few-mode erbium-doped fiber amplifier may have different transmission modes. Additionally, there may be different overlapping degrees of light fields corresponding to the different transmission modes, a light field in a pump mode, and an erbium ion. Therefore, after optical signals carried in the different transmission modes are amplified by the erbium-doped fiber amplifier, the optical signals may define different gains, and a differential mode gain is increased. How to reduce the differential mode gain in order to reduce a deviation between output powers of the optical signals carried in the different transmission modes and maintain a similar signal-to-noise ratio is an urgent problem that needs to be resolved.

SUMMARY

Embodiments of this application provide an optical amplification apparatus and a mode division multiplexing system including an optical amplification apparatus, to reduce a differential mode gain of a few-mode erbium-doped fiber amplifier and to improve transmission performance of the mode division multiplexing system.

A first aspect of embodiments of this application provides for an optical amplification apparatus, including:

The optical amplification apparatus is configured to amplify an optical signal transmitted in a few-mode fiber. The optical amplification apparatus may include a first optical amplifier, a second optical amplifier, and a mode exchanger. The mode exchanger is located between the first optical amplifier and the second optical amplifier, one port is connected to an output port of the first optical amplifier, and the other port is connected to an input port of the second optical amplifier, to form a serial design. When the optical signal is transmitted in the few-mode fiber, the first optical amplifier receives and amplifies a plurality of optical signals. The plurality of optical signals are carried in a plurality of transmission modes. The plurality of transmission modes are grouped into N groups, and each group includes two transmission modes. Then, the plurality of amplified optical signals are input into the mode exchanger. The mode exchanger exchanges two transmission modes carrying optical signals in each group. Then, the second optical amplifier receives the optical signals whose modes are exchanged, and amplifies the plurality of optical signals again, to finally achieve gain equalization of the plurality of optical signals.

Because mode field distributions in a plurality of transmission modes of the few-mode fiber are different, after optical signals that are carried in different transmission modes are amplified by an optical amplifier, the gains of the optical signals are different. According to the optical amplification apparatus provided in some embodiments, the different transmission modes may be exchanged by using the mode exchanger, so that a same optical signal is carried in two transmission modes when being amplified for two times. In this way, the gains are complementary to each other. In other words, for the optical signal, if a gain corresponding to the optical signal in the first amplifier is large, after the optical signal passes through the mode exchanger, a gain of amplifying the optical signal in the second amplifier decreases. If a gain corresponding to the optical signal in the first amplifier is small, after the optical signal passes through the mode exchanger, a gain of amplifying the optical signal in the second amplifier increases. In this way, relative gain equalization of the plurality of optical signals can be achieved to reduce a differential mode gain of the optical amplification apparatus and improve transmission performance of an entire mode division multiplexing system.

In an optional implementation, the mode exchanger exchanges every two of the plurality of transmission modes. To be specific, a same optical signal is carried in one transmission mode in a group of transmission modes in the first optical amplifier, and is carried in the other transmission mode in the group of transmission modes in the second optical amplifier. In this way, to implement gain equalization of each optical signal, gain values of each optical signal need to be substantially the same after the optical signal is amplified by the optical amplification apparatus for two times. In an ideal implementation, after each optical signal is amplified for two times, a sum of gains of the optical signal is equal to a gain threshold. It can be understood that the sum of the gains of each optical signal may fluctuate within an error precision range. For example, a deviation may be 5%.

In the foregoing implementation, when each optical signal is amplified by the optical amplification apparatus, the optical signal is successively carried in two transmission modes so that it may be amplified two times. In this way, the first optical amplifier and the second optical amplifier may cooperate with each other, without a need to require one of the optical amplifiers to amplify different optical signals with a same gain. Instead, the two optical amplifiers amplify all of the optical signals by two times, provided that all the optical signals have approximately an equal sums of gains. In this way, design difficulty of each optical amplifier is reduced, and a precision of gain equalization is improved.

In an optional implementation, the first optical amplifier may be the same as the second optical amplifier. In other words, after an optical signal carried in a same transmission mode is amplified by the first optical amplifier or the second optical amplifier, there is a same gain. In this case, an erbium ion concentration distribution of the first optical amplifier needs to be designed, so that a sum of gain values corresponding to the two transmission modes in each group is approximately equal to a target gain value. It can be understood that an error is still allowed. After the optical signals carried in the two transmission modes in each group are amplified by the first optical amplifier, a ratio of a sum of gains of the optical signals to the target gain value does not exceed a preset precision range.

It can be understood that the plurality of transmission modes of the few-mode fiber may be grouped into N groups, each group includes two transmission modes, and a sum of gain values corresponding to the two transmission modes in each group is approximately equal to the target gain value. In this case, the mode exchanger may exchange transmission modes of two optical signals in each two groups, so that after each optical signal is amplified by two times, a sum of gains is approximately equal to the target gain value. In this way, the gain equalization of the plurality of optical signals can be implemented.

In an optional implementation, in the first optical amplifier, gain values corresponding to all transmission modes are centrosymmetrically distributed. In this way, two transmission modes corresponding to a maximum gain and a minimum gain form one group, two transmission modes corresponding to a second largest gain and a second smallest gain form one group, and so on. In this way, the mode exchanger needs to exchange the two transmission modes corresponding to the maximum gain and the minimum gain, so that gain values corresponding to the two times of amplification of each optical signal are complementary to each other, and finally, gain equalization of all of the optical signals is implemented.

In an optional implementation, the first optical amplifier is the same as the second optical amplifier. In this way, design difficulty can be further reduced, and costs can be reduced.

In an optional implementation, the first optical amplifier and the second optical amplifier may each be an active optical device that amplifies the optical signal by doping an erbium ion in the few-mode fiber and simultaneously injecting pump light to perform population inversion on the erbium ion, so that stimulated emission of radiation occurs when the optical signal passes. Therefore, the first optical amplifier and the second optical amplifier may each include a few-mode erbium-doped fiber.

In an optional implementation, if the few-mode fiber is a two-mode fiber, in other words, the few-mode fiber supports two transmission modes, optical signals carried in the two transmission modes are symmetrical after being amplified by the optical amplifier, and only the two transmission modes need to be exchanged. Therefore, an erbium ion doping manner of each of the first optical amplifier and the second optical amplifier results in an even doping.

In an optional implementation, if the few-mode fiber supports a plurality of transmission modes, the erbium ion concentration distribution may need to be designed, so that the gain values corresponding to the plurality of transmission modes are approximately centrosymmetric. In this way, an erbium ion doping manner of at least one of the first optical amplifier or the second optical amplifier may be layered doping.

In an optional implementation, when amplifying the optical signal, not only is the erbium ion may be utilized, but the pump light may also be utilized to stimulate inversion of the erbium ion. Therefore, the first optical amplifier and the second optical amplifier may each include at least one pump laser.

In an optional implementation, the first optical amplifier and the second optical amplifier each include two pump lasers, one pump laser is located at a front end of the optical amplifier, and a second pump laser is located at a back end of the optical amplifier. In other words, the first optical amplifier and the second optical amplifier each support bidirectional pumping, to improve amplification performance of the optical amplifier.

A second aspect of this application provides a mode division multiplexing system. The mode division multiplexing system includes: a single-mode transmitter module, a single-mode receiver module, a mode multiplexer, a mode demultiplexer, a plurality of few-mode fibers, and an optical amplification apparatus.

The single-mode transmitter module is connected to an input port of the mode multiplexer, an output port of the mode multiplexer is connected to an input port of the mode demultiplexer through the plurality of few-mode fibers, an output port of the mode demultiplexer is connected to the single-mode receiver module, and the optical amplification apparatus is connected between the plurality of few-mode fibers.

The single-mode transmitter module is configured to generate a plurality of paths of wavelength division multiplexing signals, and transmit the plurality of paths of wavelength division multiplexing signals to the mode division multiplexer.

The mode division multiplexer is configured to process the plurality of paths of wavelength division multiplexing signals, and generate one path of signals based on the plurality of paths of wavelength division multiplexing signals. The path of signals includes a plurality of optical signals carried in a plurality of transmission modes.

The optical amplification apparatus includes a first optical amplifier, a second optical amplifier, and a mode exchanger.

The first optical amplifier is connected to an input port of the mode exchanger, and the second optical amplifier is connected to an output port of the mode exchanger.

The first optical amplifier is configured to amplify optical signals carried in a plurality of transmission modes of the few-mode fiber, the plurality of transmission modes of the few-mode fiber may be grouped into N groups, each group includes two transmission modes, and N is a positive integer greater than or equal to 1.

The mode exchanger is configured to exchange the two transmission modes carrying optical signals in each group.

The second optical amplifier is configured to amplify the optical signals that are carried in the two transmission modes in each group and whose modes are exchanged.

The mode demultiplexer is configured to demultiplex a plurality of transmission modes corresponding to one path of signals on the few-mode fiber, to obtain a plurality of paths of to-be-received signals.

The single-mode receiver module is configured to receive the plurality of paths of to-be-received signals, and demodulate the plurality of paths of to-be-received signals.

In an optional implementation, in the optical amplification apparatus, a deviation between a gain value of each optical signal and a gain threshold may still fall within 5% after the optical signals carried in the two transmission modes in each group are amplified by the first optical amplifier and the second optical amplifier.

In an optional implementation, in the optical amplification apparatus, after the optical signals carried in the two transmission modes in each group are amplified by the first optical amplifier, a ratio of a sum of gains of the optical signals to a target gain value does not exceed a preset precision requirement.

In an optional implementation, in the optical amplification apparatus, after the optical signals carried in the two transmission modes in each group are amplified by the first optical amplifier, the sum of the gains of the optical signals is equal to the target gain value.

In an optional implementation, in the optical amplification apparatus, a gain value obtained after an optical signal carried in a transmission mode is amplified by the first optical amplifier is the same as a gain value obtained after the optical signal carried in the same transmission mode is amplified by the second optical amplifier.

In an optional implementation, in the optical amplification apparatus, the first optical amplifier and the second optical amplifier each include a few-mode erbium-doped fiber.

In an optional implementation, in the optical amplification apparatus, when N is equal to 1, an erbium ion doping manner of each of the first optical amplifier and the second optical amplifier results in an even doping.

In an optional implementation, in the optical amplification apparatus, when N is greater than 1, an erbium ion doping manner of at least one of the first optical amplifier and the second optical amplifier is layered doping.

In an optional implementation, in the optical amplification apparatus, the first optical amplifier and the second optical amplifier each include at least one pump laser.

In an optional implementation, in the optical amplification apparatus, the first optical amplifier includes a first pump laser and a second pump laser, and the second optical amplifier includes a third pump laser and a fourth pump laser; the first pump laser is connected to a signal input port of the few-mode erbium-doped fiber in the first optical amplifier, and the second pump laser is connected to a signal output port of the few-mode erbium-doped fiber in the first optical amplifier; and the third pump laser is connected to a signal input port of the few-mode erbium-doped fiber in the second optical amplifier, and the fourth pump laser is connected to a signal output port of the few-mode erbium-doped fiber in the second optical amplifier.

A third aspect of this application provides a method for amplifying a signal by using an optical amplification apparatus, including:

The optical amplification apparatus receives a plurality of optical signals transmitted in a few-mode fiber. The plurality of optical signals are respectively carried in a plurality of transmission modes. The plurality of transmission modes may be grouped into N groups, and each group includes two transmission modes. A first optical amplifier in the optical amplification apparatus amplifies the optical signals carried in the plurality of transmission modes, and transmits the plurality of amplified optical signals to a mode exchanger in the optical amplification apparatus. The mode exchanger exchanges two transmission modes carrying optical signals in each group, and transmits, to a second optical amplifier in the optical amplification apparatus for amplification, all optical signals whose modes are exchanged. The second optical amplifier receives a plurality of optical signals whose modes are exchanged, and amplifies the plurality of optical signals for a second time, to finally implement gain equalization.

In an optional implementation, after the optical amplification apparatus amplifies the plurality of optical signals transmitted in the few-mode fiber for a second time, a sum of gains of amplifying each optical signal for two times is approximately equal to a gain threshold, and an error range may not exceed 5% of the gain threshold.

In an optional implementation, the first optical amplifier in the optical amplification apparatus receives the plurality of optical signals in the few-mode fiber, and amplifies the plurality of optical signals. After the optical signals carried in the two transmission modes in each group are amplified by the first optical amplifier, a ratio of a sum of gains of the optical signals to a target gain value may not exceed a preset precision requirement.

In an optional implementation, in an optimal amplification solution of the first optical amplifier in the optical amplification apparatus, a sum of gains corresponding to the optical signals carried in the two transmission modes in each group is equal to the target gain value.

In an optional implementation, the first optical amplifier and the second optical amplifier in the optical amplification apparatus are the same. In other words, a gain value obtained after an optical signal carried in a transmission mode is amplified by the first optical amplifier is the same as a gain value obtained after the optical signal carried in the same transmission mode is amplified by the second optical amplifier.

It can be learned from the foregoing technical solutions that embodiments of this application have the following advantages:

According to the embodiments of the optical amplification apparatus provided in this application, a design of a first optical amplifier, a mode exchanger, and a second optical amplifier may be used to amplify the plurality of optical signals transmitted in the few-mode fiber for two times, and different transmission modes are exchanged by using the mode exchanger, so that a same optical signal is carried in two transmission modes when being amplified for two times. In this way, the gains are complementary to each other. In other words, for the optical signal, if a gain corresponding to the optical signal in the first amplifier is large, after the optical signal passes through the mode exchanger, a gain of amplifying the optical signal in the second amplifier decreases. If a gain corresponding to the optical signal in the first amplifier is small, after the optical signal passes through the mode exchanger, a gain of amplifying the optical signal in the second amplifier increases. In this way, relative gain equalization of the plurality of optical signals can be achieved, to reduce a differential mode gain of the optical amplification apparatus, and improve transmission performance of an entire mode division multiplexing system.

DESCRIPTION OF EMBODIMENTS

Figure 1:
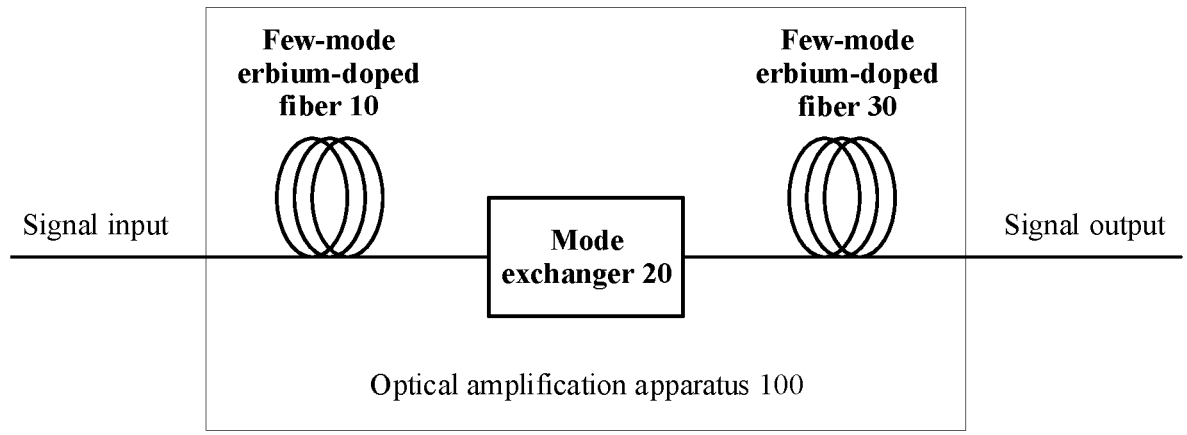
FIG. 1 is a schematic diagram of a structure of an optical amplification apparatus according to an embodiment of this application.

Embodiments of this application provide for an optical amplification apparatus and a mode division multiplexing system including an optical amplification apparatus, to reduce a differential mode gain of a few-mode erbium-doped fiber amplifier and improve transmission performance of the mode division multiplexing system.

In the specification, claims, and accompanying drawings of this application, the terms "first", "second", "third", "fourth", and the like (if they exist) are intended to distinguish between similar objects but do not necessarily indicate a specific order or sequence. It should be understood that data used in such a way is interchangeable in a proper case, so that the embodiments described herein can be implemented in an order other than the order illustrated or described herein. In addition, the terms "include" and "contain" and any other variants mean to cover the non-exclusive inclusion, for example, a process, method, system, product, or device that includes a series of steps or units (e.g., circuits) is not necessarily limited to those steps or units, but may include other steps or units not expressly listed or inherent to such a process, method, product, or device.

With a rapid growth of network traffic, a capacity of a conventional single-mode fiber communication system cannot meet a transmission requirement of the network traffic. As a manner of implementing multiplexing based on space division (e.g., space division multiplexing is implemented by combining a plurality of fibers to form a beam, or space division multiplexing is implemented in a same fiber), a space division multiplexing (SDM) system in which a few-mode fiber (FMF) or a multi-core fiber (MCF) is used as a transmission medium can greatly improve a capacity of a fiber communication system, and is to be mainly deployed in future technologies. Usually, the space division multiplexing system includes a mode division multiplexing system in which a few-mode fiber is used as a transmission medium and a core division multiplexing system in which a multi-core fiber is used as a transmission medium.

The few-mode fiber is a single-core fiber, and an area of a fiber core of the few-mode fiber is large enough to transmit parallel signal flows by using several independent spatial modes. In other words, the few-mode fiber may provide a plurality of transmission modes, and each transmission mode may carry an optical signal to implement mode division multiplexing. When the few-mode fiber is used to transmit an optical signal for a long distance, a few-mode erbium-doped fiber amplifier (FM-EDFA) may be the relay amplifier, and is configured to amplify the optical signal transmitted in the few-mode fiber to compensate for a loss of the optical signal in a transmission process and improve transmission performance.

The few-mode erbium-doped fiber amplifier is an active optical device that amplifies an optical signal by doping an erbium ion in the few-mode fiber and simultaneously injecting pump light to perform population inversion on the erbium ion, so that stimulated emission of radiation occurs when the optical signal passes. An overlapping degree of a light field of a transmission mode carrying an optical signal, a light field of pump light, and an erbium ion directly affects a gain of the optical signal. A larger overlapping degree of the light field of the transmission mode, the light field of the pump light, and the erbium ion indicates a larger gain of the optical signal carried in the transmission mode. Therefore, when the light field of the pump light is determined, an erbium ion concentration distribution in the few-mode erbium-doped fiber directly affects the gain values corresponding to optical signals carried in different transmission modes, and the gain values corresponding to the different transmission modes may be completely different.

An important indicator of the few-mode erbium-doped fiber amplifier is a differential mode gain (DMG), and is used to measure a difference between the gains of optical signals that are carried in all transmission modes of the few-mode fiber and that are amplified by the few-mode erbium-doped fiber amplifier. A larger DMG indicates a larger deviation between output powers of optical signals in different transmission modes and a larger difference between signal-to-noise ratios. This affects a linear capacity limit, and degrades transmission performance of an entire mode division multiplexing optical communication system. Therefore, how to reduce the DMG of the few-mode erbium-doped fiber amplifier and implement gain equalization in different transmission modes of the few-mode fiber becomes an urgent problem to be resolved.

Based on the foregoing problem, an embodiment of this application provides an optical amplification apparatus. Core components of the optical amplification apparatus include two few-mode erbium-doped fibers and a mode exchanger, to amplify an optical signal in different transmission modes for two times, so as to achieve relative gain equalization of a plurality of optical signals in a few-mode fiber, ensure broadband flatness performance of a gain of the optical amplification apparatus, greatly reduce a power difference between different modes in an entire mode division multiplexing system, and improve transmission performance.

FIG. 1 is a schematic diagram of a structure of an optical amplification apparatus according to an embodiment of this application. As shown in FIG. 1, an optical amplification apparatus 100 includes a few-mode erbium-doped fiber 10, a mode exchanger 20, and a few-mode erbium-doped fiber 30. The mode exchanger 20 is located between the few-mode erbium-doped fiber 10 and the few-mode erbium-doped fiber 30, one port of the few-mode erbium-doped fiber 10 and one port of the few-mode erbium-doped fiber 30 are connected to the mode exchanger 20, to form a serial design, and the other ports are connected to few-mode fibers for transmitting an optical signal. During signal transmission, a plurality of optical signals are transmitted to the few-mode erbium-doped fiber 10 through the few-mode fiber, amplified by the few-mode erbium-doped fiber 10, and then transmitted to the mode exchanger 20 for mode exchange. The few-mode erbium-doped fiber 30 amplifies, for a second time, the plurality of optical signals whose modes are exchanged, and then the optical signals continue to be transmitted forward through the few-mode fiber.

Figure 2A:
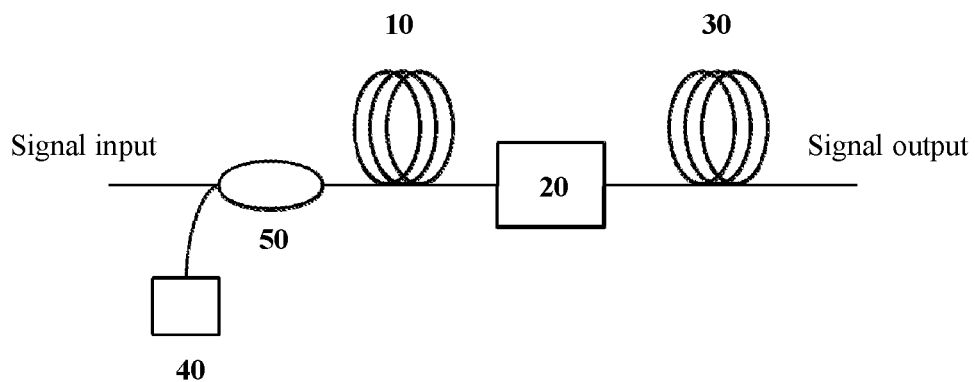
FIG. 2A is a schematic diagram of a structure of another optical amplification apparatus according to an embodiment of this application.

It can be understood that, to amplify the optical signal, not only an erbium ion in the few-mode erbium-doped fiber may be required, but also pump light needs to be injected into the few-mode erbium-doped fiber. In this way, stimulated emission of radiation can occur when the optical signal passes through the few-mode erbium-doped fiber. The pump light may be applied in a plurality of manners, and different pumping manners affect a structure of the entire optical amplification apparatus. For example, the optical amplification apparatus may perform unidirectional joint pumping. In other words, the few-mode erbium-doped fiber 10 and the few-mode erbium-doped fiber 30 share one unidirectional pump. As shown in FIG. 2A, one port of a wavelength division multiplexer 50 is connected to the few-mode fiber, and the other port is connected to the few-mode erbium-doped fiber 10. A pump laser 40 is connected to the wavelength division multiplexer 50. The optical signal is transmitted to the wavelength division multiplexer 50 along the few-mode fiber. The wavelength division multiplexer 50 combines the optical signal with pump light emitted by the pump laser 40, and then transmits, to the few-mode erbium-doped fiber 10, an optical signal obtained through combination to interact with the erbium ion in the few-mode erbium-doped fiber 10 to amplify the optical signal. A forward pumping manner is used for the pump laser 40, and a direction in which pump light is incident into the few-mode erbium-doped fiber 10 and the few-mode erbium-doped fiber 30 is same as an optical signal transmission direction.

Figure 2B:
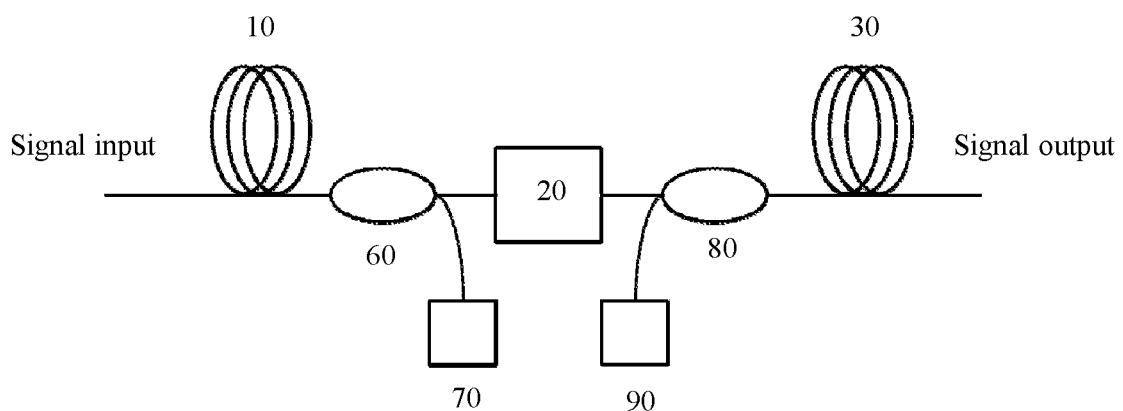
FIG. 2B is a schematic diagram of a structure of another optical amplification apparatus according to an embodiment of this application.

For example, as shown in FIG. 2B, in the optical amplification apparatus, two few-mode erbium-doped fibers may perform unidirectional pumping. One port of a wavelength division multiplexer 60 is connected to the few-mode erbium-doped fiber 10, and the other port is connected to an input port of the mode exchanger 20. A pump laser 70 is connected to the wavelength division multiplexer 60. One port of a wavelength division multiplexer 80 is connected to an output port of the mode exchanger 20, and the other port is connected to the few-mode erbium-doped fiber 30. The pump laser 90 is connected to the wavelength division multiplexer 80. It can be understood that, in an optical signal transmission process, the optical signal is transmitted to the mode exchanger 20 along the few-mode erbium-doped fiber 10, and then transmitted to the few-mode erbium-doped fiber 30. The pump laser 70 emits pump light the few-mode erbium-doped fiber 10 in a backward pumping manner. In other words, an incidence direction of the pump light in the pump laser 70 is opposite to the optical signal transmission direction. The pump laser 90 transmits pump light to the few-mode erbium-doped fiber 30 in a forward pumping manner. An incidence direction of the pump light in the pump laser 90 is the same as the optical signal transmission direction.

Figure 2C:
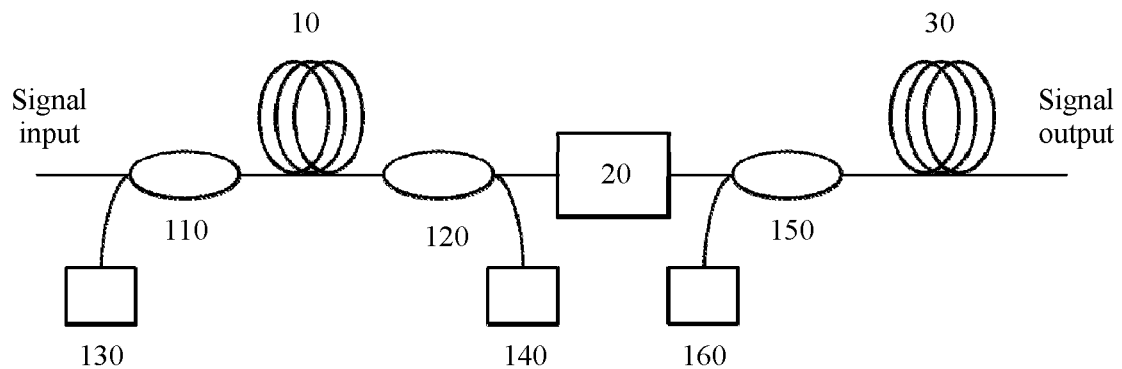
FIG. 2C is a schematic diagram of a structure of another optical amplification apparatus according to an embodiment of this application.

For example, as shown in FIG. 2C, in the optical amplification apparatus, one section of few-mode erbium-doped fiber may alternatively perform bidirectional pumping, and the other section may perform unidirectional pumping. For example, a front end and a back end of the few-mode erbium-doped fiber 10 are respectively connected to a wavelength division multiplexer 110 and a wavelength division multiplexer 120, a pump laser 130 is connected to the wavelength division multiplexer 110, and a pump laser 140 is connected to the wavelength division multiplexer 120. A front end of the few-mode erbium-doped fiber 30 is connected to a wavelength division multiplexer 150, and a pump laser 160 is connected to the wavelength division multiplexer 150. A direction in which pump light in the pump laser 130 is incident into the few-mode erbium-doped fiber 10 is the same as the optical signal transmission direction. A direction in which pump light in the pump laser 140 is incident into the few-mode erbium-doped fiber 10 is opposite to the optical signal transmission direction. A direction in which the pump light in the pump laser 160 is incident into the few-mode erbium-doped fiber 30 is the same as the optical signal transmission direction.

Figure 2D:
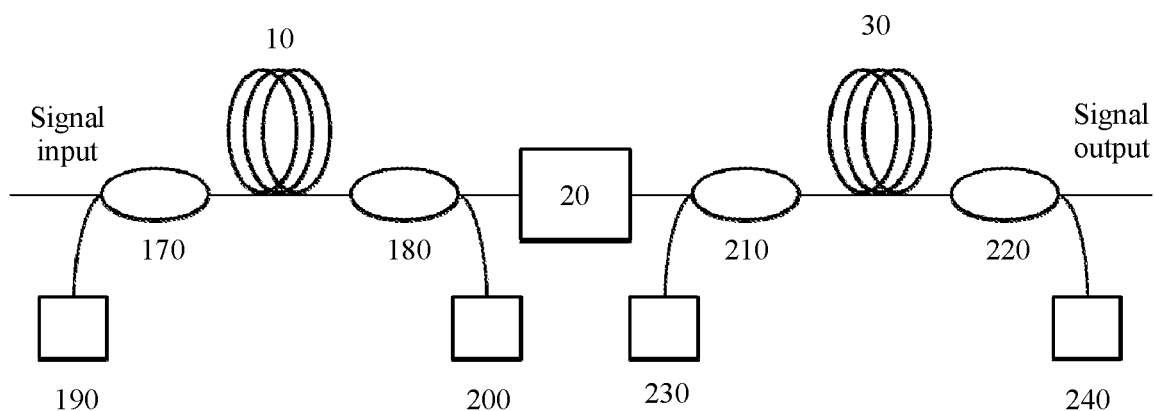
FIG. 2D is a schematic diagram of a structure of another optical amplification apparatus according to an embodiment of this application.

For example, as shown in FIG. 2D, in the optical amplification apparatus, two few-mode erbium-doped fibers may alternatively both perform bidirectional pumping. For example, a front end and a back end of the few-mode erbium-doped fiber 10 are each connected to a wavelength division multiplexer 170 and a wavelength division multiplexer 180, a pump laser 190 is connected to the wavelength division multiplexer 170, and a pump laser 200 is connected to the wavelength division multiplexer 180. A front end and a back end of the few-mode erbium-doped fiber 30 are each connected to a wavelength division multiplexer 210 and a wavelength division multiplexer 220, a pump laser 230 is connected to the wavelength division multiplexer 210, and a pump laser 240 is connected to the wavelength division multiplexer 220. It can be understood that, a direction in which pump light in the pump laser 190 is incident into the few-mode erbium-doped fiber 10 is the same as the optical signal transmission direction, a direction in which pump light in the pump laser 200 is incident into the few-mode erbium-doped fiber 10 is opposite to the optical signal transmission direction, a direction in which the pump light in the pump laser 230 is incident into the few-mode erbium-doped fiber 30 is the same as the optical signal transmission direction, and a direction in which pump light in the pump laser 240 is incident into the few-mode erbium-doped fiber 30 is opposite to the optical signal transmission direction. It can be understood that a pumping manner of a pump laser is not limited in this application.

The following describes an amplification principle of an optical amplification apparatus provided in an embodiment of this application.

First, a few-mode erbium-doped fiber supports M transmission modes. In other words, a mode field distribution in each transmission mode occupies a different space in a fiber, and the transmission modes may be denoted as C1 to CM. Because different mode field distributions exist in different transmission modes and have different overlapping degrees with an erbium ion in the few-mode erbium-doped fiber, optical signals carried in the different transmission modes may have completely different gains after being amplified by a same few-mode erbium-doped fiber. It can be understood that, an overlapping area with the erbium ion and the pump light in each mode can be changed by adjusting an erbium ion concentration distribution and a light field distribution of pump light, to change a gain value corresponding to each transmission mode. Therefore, the gain value corresponding to each transmission mode can be adjusted by designing an erbium ion distribution in the few-mode erbium-doped fiber. To implement gain equalization, when one few-mode erbium-doped fiber is used to amplify a plurality of optical signals, mode field distributions in all transmission modes need to be considered, and a design of this arrangement may be complex. Therefore, a simpler design solution may be used. In other words, two few-mode erbium-doped fibers are used to amplify a plurality of optical signals for two times, so that the gain values corresponding to two times of amplification of each optical signal are complementary to each other so as to implement gain equalization. In this way, when an erbium ion concentration distribution of each few-mode erbium-doped fiber is designed, final gain equalization can be implemented provided that a regular distribution of the gain value corresponding to the optical signal in each transmission mode is ensured.

(1) In an optional implementation, a few-mode erbium-doped fiber 10 and a few-mode erbium-doped fiber 30 each support M transmission modes. After optical signals in the M transmission modes are amplified by the few-mode erbium-doped fiber 10, gains of the optical signals in the M transmission modes are respectively G1, G2, . . . , and GM. After optical signals in the M transmission modes are amplified by the few-mode erbium-doped fiber 30, gains of the optical signals are respectively H1, H2, . . . , and HM. If M optical signals are respectively carried in the M transmission modes, these optical signals are first transmitted to the few-mode erbium-doped fiber 10 through the few-mode fiber. After the optical signals are amplified by the few-mode erbium-doped fiber 10, a gain value of a first optical signal is G1, a gain value of a second optical signal is G2, . . . , and a gain value of a $M^{th}$ optical signal is GM. It is assumed that G1>G2> . . . >GM. It may be designed that the mode exchanger 20 converts a transmission mode of the first optical signal into CM, converts a transmission mode of the $M^{th}$ optical signal into C1, converts a transmission mode of the second optical signal into C(M−1), converts a transmission mode of the $(M−1)^{th}$ optical signal into C2, and so on, and then transmits, to the few-mode erbium-doped fiber 30 for amplification, the optical signal whose modes are exchanged. In this case, after the optical signals are amplified by the few-mode erbium-doped fiber 30, a gain of the first optical signal is HM, a gain of the second optical signal is H(M−1), . . . , and a gain of the $M^{th}$ optical signal is H1. Therefore, a gain of the first optical signal is G1+HM, a gain of the second optical signal is G2+H(M−1), . . . , and a gain of the $M^{th}$ optical signal is GM+H1. In this case, to implement gain equalization of each optical signal, only erbium ion concentration distributions in the few-mode erbium-doped fiber 10 and the few-mode erbium-doped fiber 30 need to be adjusted, so that G1+HM, G2+H(M−1), and GM+H1 are substantially the same as a gain threshold.

It should be understood that, it is assumed that a gain threshold of an optical amplification apparatus is S, where this value represents an ideal gain value obtained after the optical signal input into the optical amplification apparatus is amplified for two times. In an optional solution, an allowable deviation may need to be controlled to fall within a 5% deviation. In other words, values of G1+HM, G2+HM−1, GM+H1 may need to be greater than or equal to 0.95 S and less than or equal to 1.05 S. It can be understood that an error fluctuation range of the optical amplification apparatus may be determined based on an actual requirement. This is not limited.

(2) In another optional implementation, in an optical amplification apparatus 100, a few-mode erbium-doped fiber 10 and a few-mode erbium-doped fiber 30 may alternatively correspond to completely equal optical amplifiers. In other words, the few-mode erbium-doped fiber 10 and the few-mode erbium-doped fiber 30 each support M transmission modes. After optical signals in the M transmission modes are amplified by the few-mode erbium-doped fiber 10 and the few-mode erbium-doped fiber 30, the gains of the optical signals in the M transmission modes are G1, G2, . . . , and GM.

For one few-mode erbium-doped fiber, an erbium ion concentration distribution in the few-mode erbium-doped fiber may be designed, so that gain values corresponding to all transmission modes are approximately symmetrically distributed. In other words, transmission modes C1 to CM may be grouped into N groups, and each group includes two transmission modes. For example, C1 and CM are a group, C2 and C(M−1) are a group, and so on. Then, the erbium ion concentration distribution is designed, so that a sum of gain values corresponding to two transmission modes in each group approximately has a same value. That is:

$$G1+GM=G2+G(M-1)=G(1+i)+G(M-i).$$

It can be understood that, in the foregoing solution, a proper error range fluctuation may be allowed. After amplification is performed by the first optical amplifier, a sum of gains corresponding to two transmission modes in each group may be preset to a target gain value. After optical signals carried in two transmission modes in each group are amplified by the first optical amplifier (e.g., few-mode erbium-doped fiber 10), a ratio of a sum of gains of the optical signals to the target gain value does not exceed a preset precision requirement. For example, the preset precision requirement may be 10%, and the target gain value is Q. In other words, G1+GM may not be completely the same as G(1+i)+G(M−i), provided that G1+GM is greater than or equal to 0.9 Q and less than or equal to 1.1 Q; or a ratio of G1+GM to G(1+i)+G(M−i) is between 0.9 and 1.1.

For the foregoing design, an exchange policy of the mode exchanger may be that two transmission modes in each group are exchanged. For example, a transmission mode initially corresponding to the first optical signal is C1, and after the first optical signal is amplified by the few-mode erbium-doped fiber 10, a gain value of the first optical signal is G1. In this way, the mode exchanger may convert a transmission mode of the first amplified optical signal into a transmission mode CM. Because the few-mode erbium-doped fiber 30 is the same as the few-mode erbium-doped fiber 10, after the first optical signal is amplified again by the few-mode erbium-doped fiber 30, a gain value corresponding to the first optical signal is a gain value GM corresponding to CM. In this way, after the first optical signal is amplified for two times, a gain value corresponding to the first optical signal is G1+GM. Similarly, a gain value of a second optical signal is G2+G(M−1), . . . , and a gain value of a $M^{th}$ optical signal is G1+GM. In this way, it is ensured that gain values of all optical signals are substantially the same, and relative gain equalization of a plurality of optical signals in the few-mode fiber may be ensured.

In an optional solution, in the few-mode erbium-doped fiber 10 and the few-mode erbium-doped fiber 30, the gain values corresponding to all transmission modes are centrosymmetrically distributed. For example, the few-mode erbium-doped fiber 10 and the few-mode erbium-doped fiber 30 each include six transmission modes, a gain value of an optical signal carried in C1 is 10 dB after the optical signal is amplified by the few-mode erbium-doped fiber 10, and gain values corresponding to C1 to C6 are respectively 12 dB, 10 dB, 8 dB, 6 dB, 4 dB, and 2 dB. Therefore, an exchange policy of the mode exchanger is to centrosymmetrically exchange all modes, that is, to exchange a mode in which a maximum gain is obtained and a mode in which a minimum gain is obtained, so as to exchange the mode in which the maximum gain is obtained and the mode in which the minimum gain is obtained (C2 and C(M−1)), and so on, that is, exchange C1 and C6, exchange C2 and C5, and exchange C3 and C4. In this way, after each optical signal is amplified for two times, a gain value is 14 dB.

The following describes a design of an erbium ion concentration distribution of a few-mode erbium-doped fiber.

(1) If a few-mode fiber supports only two transmission modes (LP01 and LP11), an even doping manner is used for erbium ions of the few-mode erbium-doped fiber, so that gain values corresponding to the two modes are symmetrical. For example, after optical signals carried in the transmission modes LP01 and LP11 are amplified by a two-mode erbium-doped fiber, corresponding gain values are G1 and G2. Then, the amplified optical signals are input into the mode exchanger for mode exchange. In this case, an optical signal originally carried in LP01 is carried in LP11, and an optical signal originally carried in LP11 is carried in LP01. Then, the optical signals are amplified by a second few-mode erbium-doped fiber to obtain complementary gains, gain equalization is implemented, and a DMG of an optical amplification apparatus is reduced.

Figure 3:
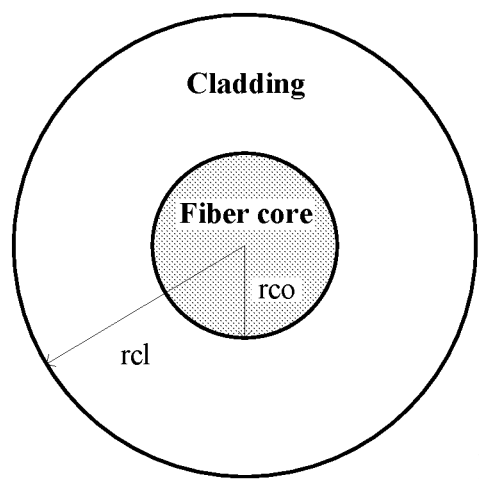
FIG. 3 is a diagram of a cross-sectional structure of a two-mode erbium-doped fiber according to an embodiment of this application.

FIG. 3 is a diagram of a cross-sectional structure of a two-mode erbium-doped fiber according to an embodiment of this application. The two-mode erbium-doped fiber includes a fiber core and a cladding. Erbium ions are evenly doped in the fiber core, a fiber core radius is rco=8 µm, a cladding radius is rcl=62.5 µm, and a numerical aperture is NA=0.1. In an actual application, an allowable range of an erbium ion doping concentration is from $2\times10^{24}$ to $8\times10^{24}$, an allowable error range of the fiber core radius is from 6 µm to 10 µm, an allowable error range of the cladding radius is from 62.5 µm to 100 µm, and an allowable range of the numerical aperture is from 0.08 µm to 0.15 µm.

Figure 4:
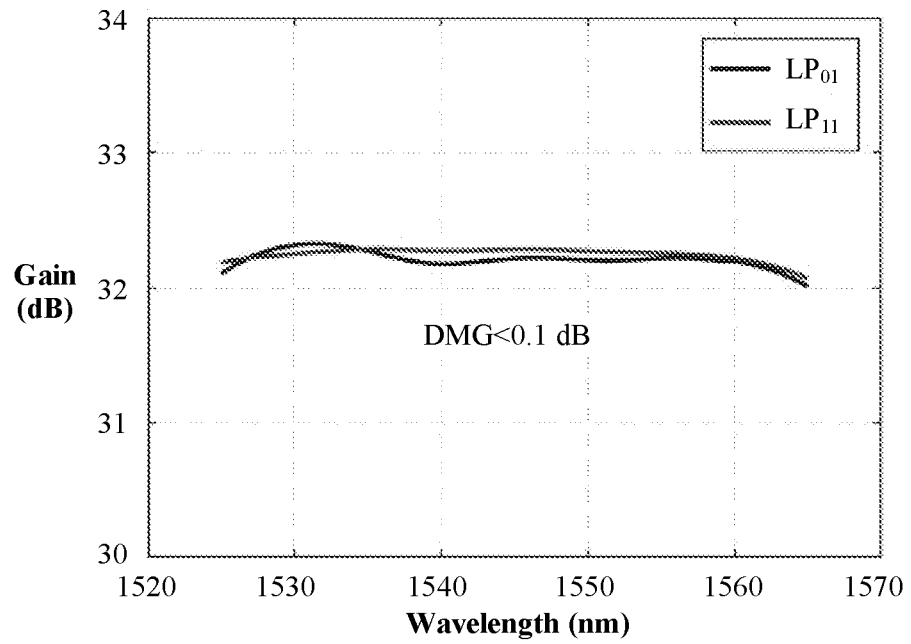
FIG. 4 is a diagram of C-band broadband spectrums of two modes output by an optical amplification apparatus according to an embodiment of this application.

Lengths of two two-mode erbium-doped fibers in the optical amplification apparatus may be respectively 11 m and 13 m. A 98 nm fundamental mode forward pumping manner may be used for a pump laser that transmits pump light to the two-mode erbium-doped fiber, and a corresponding pump power may be respectively P1=0.5 W and P2=0.4 W. A passive component between the two erbium-doped fibers may include a two-mode mode exchanger, and a variable optical attenuator may be further added. After simulation, if input powers of optical signals carried in two modes LP01 and LP11 are 0.1 mW before entering an optical amplification apparatus, C-band broadband spectrums of the two modes output by the optical amplification apparatus are shown in FIG. 4, a C-band DMG of the optical amplification apparatus is less than 0.2 dB, and spectral flatness is less than 0.5 dB.

(2) If a few-mode fiber supports a plurality of transmission modes, for example, four transmission modes (LP01, LP11, LP21, and LP02), even doping cannot ensure that gain values corresponding to all modes are centrosymmetric. In this case, a layered doping manner may need to be used, so that gain values G1, G2, G3, and G4 corresponding to LP01, LP11, LP21, and LP02 meet a centrosymmetric distribution condition. If G1>G2>G3>G4, the mode exchanger needs to be designed to exchange modes of an optical signal carried in $LP_{01}$ and an optical signal carried in LP02, and exchange modes of an optical signal carried in LP11 and an optical signal carried in LP21.

Embodiments of this application provide for a design of a 1530 nm four-mode erbium-doped fiber and a 1565 nm four-mode erbium-doped fiber. For a design of the 1530 nm four-mode erbium-doped fiber, structure parameters of the 1530 nm four-mode optical signal may be as follows: a fiber core radius is rco=8 µm, an allowable error range of the fiber core radius is 8 µm to 20 µm, a cladding radius is rcl=62.5 µm, and an allowable error range of the cladding radius is 62.5 µm to 100 µm, a numerical aperture is NA=0.15, and an allowable error range of the numerical aperture is 0.1 to 0.2.

In the fiber core, a layered doping manner is used for an erbium ion, and an erbium ion concentration of each of two four-mode erbium-doped fibers for which layered doping is used may be as follows:

$$N_r(Er^{3+}) = \begin{cases} 2.7\times10^{24}, & r < 3.1 \text{ µm} \\ 4.4\times10^{24}, & r > 4.9 \text{ µm} \end{cases}$$

Figure 5:
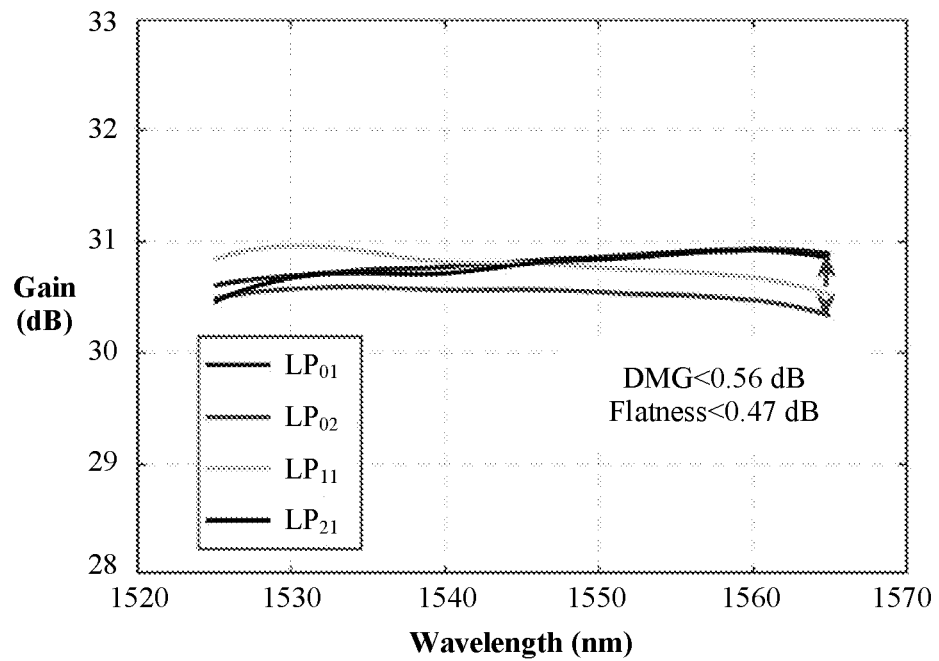
FIG. 5 is a diagram of C-band broadband spectrums of four modes output by an optical amplification apparatus according to an embodiment of this application.

An allowed range of an erbium ion doping concentration is from $2\times10^{24}$ to $8\times10^{24}$. A length of each of the two four-mode erbium-doped fibers may be 15 m, and a power of pump light may be 0.5 W or 1.1 W. Based on the foregoing design, after optical signals carried in LP01, LP02, LP11, and LP21 are amplified by one section of four-mode erbium-doped fiber, the gains of the optical signals are respectively G1=28.19 dB, G2=27.80 dB, G3=27.08 dB, and G4=26.74 dB, which satisfies a requirement that mode gains are centrosymmetrically distributed. In this way, a mode exchanger may be designed based on the requirement that mode gains are centrosymmetrically distributed. To be specific, LP01 and LP21 are exchanged, and LP11 and LP02 are exchanged. For the exchanged four modes, after the amplification is performed by the four-mode erbium-doped fiber 30, an output spectrum is shown in FIG. 5. The DMG is less than 0.56 dB, and C-band spectrum flatness is less than 0.47 dB.

In the optical amplification apparatus provided in embodiments of this application, two optical amplifiers and a mode exchanger are designed to implement gain equalization of a plurality of optical signals that are simultaneously transmitted in a few-mode fiber, to greatly reduce a DMG of the optical amplification apparatus, implement good spectral flatness, and improve transmission performance of an entire mode division multiplexing system.

Figure 6:
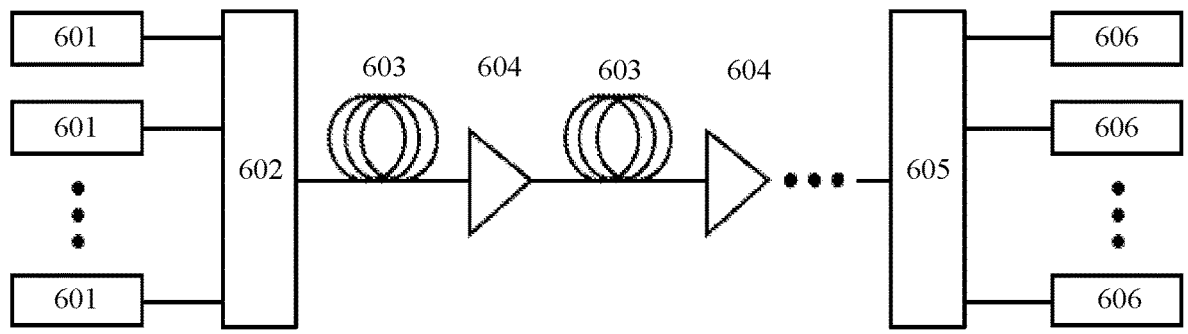
FIG. 6 is a diagram of a system architecture of a mode division multiplexing system according to an embodiment of this application.

FIG. 6 is a diagram of a system architecture of a mode division multiplexing system according to an embodiment of this application. As shown in FIG. 6, the mode division multiplexing system includes a single-mode transmitter module 601, a mode division multiplexer 602, a plurality of few-mode fibers 603, an optical amplification apparatus 604, a mode demultiplexer 605, and a single-mode receiver module 606.

The single-mode transmitter module 601 is configured to: generate a plurality of paths of wavelength division multiplexing signals, and transmit the plurality of paths of wavelength division multiplexing signals to the mode division multiplexer. For example, the single-mode transmitter module may be a single-mode transceiver (e.g., laser), configured to transmit or receive the plurality of wavelength division multiplexing signals.

The mode division multiplexer 602 is configured to process the plurality of paths of wavelength division multiplexing signals, and generate one path of signals based on the plurality of paths of wavelength division multiplexing signals. The path of signals includes a plurality of optical signals carried in a plurality of transmission modes.

The few-mode fiber is configured to transmit an optical signal, may support a plurality of transmission modes, and may simultaneously transmit a plurality of paths of optical signals. Because a signal loss occurs in a transmission process of the optical signal, to ensure transmission quality of the optical signal and extend a transmission distance, the optical amplification apparatus 604 needs to amplify the plurality of paths of transmitted optical signals at intervals, to compensate for a signal transmission loss.

A first optical amplifier, a second optical amplifier, and a mode exchanger are included inside the optical amplification apparatus 604.

The first optical amplifier is connected to an input port of the mode exchanger, and the second optical amplifier is connected to an output port of the mode exchanger. The first optical amplifier is configured to amplify optical signals carried in a plurality of transmission modes of the few-mode fiber, the plurality of transmission modes of the few-mode fiber may be grouped into N groups, each group includes two transmission modes, and N is a positive integer greater than or equal to 1. The mode exchanger is configured to exchange modes of optical signals carried in two transmission modes in each group. The second optical amplifier is configured to amplify the optical signals that are carried in the two transmission modes in each group and whose modes are exchanged. For an implementation and a function of the optical amplification apparatus 604, refer to the description of the optical amplification apparatus 100 in the foregoing embodiment. Details are not described herein.

The mode demultiplexer 605 is configured to demultiplex a plurality of transmission modes corresponding to one path of signals on the few-mode fiber, to obtain a plurality of paths of to-be-received signals.

The single-mode receiver module 606 is configured to: receive the plurality of paths of to-be-received signals, and demodulate the plurality of paths of to-be-received signals. It can be understood that the single-mode receiver module may be a single-mode transceiver, configured to transmit or receive a plurality of paths of wavelength division multiplexing signals.

In an optional implementation, in the optical amplification apparatus 604, a deviation between a gain value of each optical signal and a gain threshold falls within a 5% deviation after the optical signals carried in the two transmission modes in each group are amplified by the first optical amplifier and the second optical amplifier.

In an optional implementation, in the optical amplification apparatus 604, after the optical signals carried in the two transmission modes in each group are amplified by the first optical amplifier, a ratio of a sum of gains of the optical signals to a target gain value does not exceed a preset precision requirement.

In an optional implementation, in the optical amplification apparatus 604, after the optical signals carried in the two transmission modes in each group are amplified by the first optical amplifier, the sum of the gains of the optical signals is equal to the target gain value.

In an optional implementation, in the optical amplification apparatus 604, a gain value obtained after an optical signal carried in a transmission mode is amplified by the first optical amplifier is the same as a gain value obtained after the optical signal carried in the same transmission mode is amplified by the second optical amplifier.

In an optional implementation, in the optical amplification apparatus 604, the first optical amplifier and the second optical amplifier each include a few-mode erbium-doped fiber.

In an optional implementation, in the optical amplification apparatus 604, when N is equal to 1, an erbium ion doping manner of each of the first optical amplifier and the second optical amplifier results in an even doping.

In an optional implementation, in the optical amplification apparatus 604, when N is greater than 1, an erbium ion doping manner of at least one of the first optical amplifier or the second optical amplifier results in a layered doping.

In an optional implementation, in the optical amplification apparatus 604, the first optical amplifier and the second optical amplifier each include at least one pump laser.

In an optional implementation, in the optical amplification apparatus 604, the first optical amplifier includes a first pump laser and a second pump laser, and the second optical amplifier includes a third pump laser and a fourth pump laser. The first pump laser is connected to a signal input port of the few-mode erbium-doped fiber in the first optical amplifier, and the second pump laser is connected to a signal output port of the few-mode erbium-doped fiber in the first optical amplifier. The third pump laser is connected to a signal input port of a few-mode erbium-doped fiber in the second optical amplifier, and the fourth pump laser is connected to a signal output port of the few-mode erbium-doped fiber in the second optical amplifier, and transmits a plurality of amplified optical signals to the mode exchanger in the optical amplification apparatus.

Figure 7:
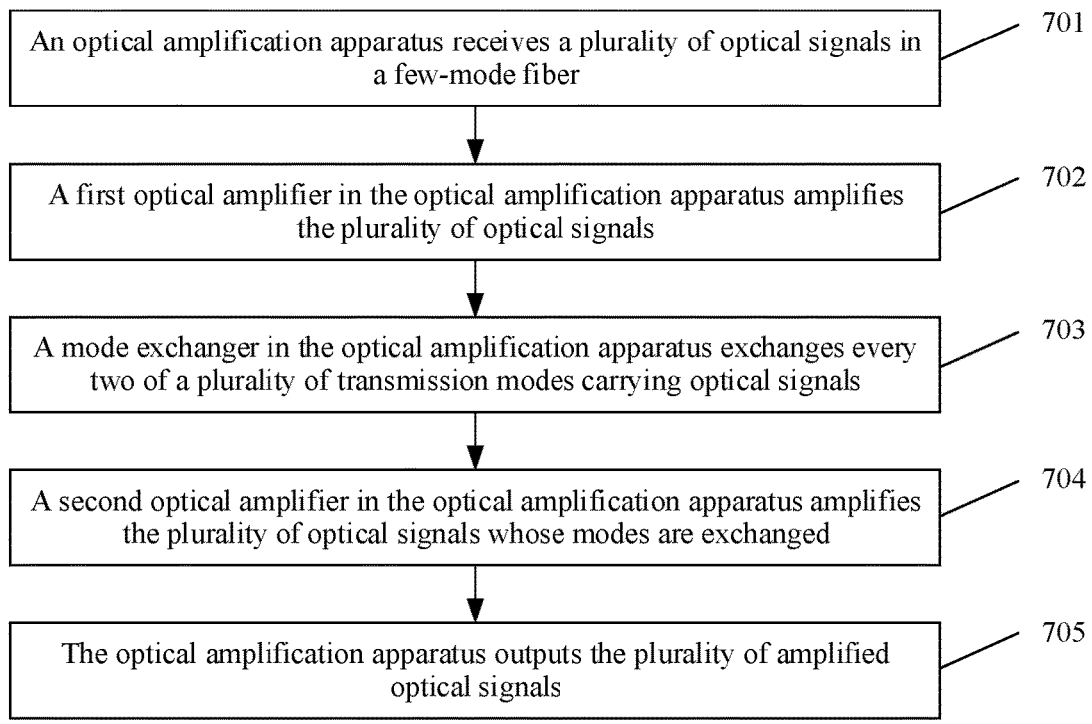
FIG. 7 is an example flowchart of a method for amplifying a signal by using an optical amplification apparatus according to an embodiment of this application.

FIG. 7 shows a method for amplifying a signal by using an optical amplification apparatus according to an embodiment of this application. As shown in FIG. 7, the method includes the following steps.

701: The optical amplification apparatus receives a plurality of optical signals in a few-mode fiber.

It can be understood that, the optical amplification apparatus receives the plurality of optical signals transmitted in the few-mode fiber, and the plurality of optical signals are respectively carried in a plurality of transmission modes. The plurality of transmission modes may be grouped into N groups, and each group includes two transmission modes. After the optical amplification apparatus amplifies optical signals carried in all transmission modes, gain values of the optical signals are different.

702: A first optical amplifier in the optical amplification apparatus amplifies the plurality of optical signals.

The gain values of the plurality of optical signals that are amplified by the first optical amplifier are regularly distributed. For example, a design of the first optical amplifier ensures that a sum of gain values of optical signals carried in two transmission modes in each group is approximately equal to a target gain value.

703: A mode exchanger in the optical amplification apparatus exchanges every two of a plurality of transmission modes carrying optical signals.

The mode exchanger exchanges two transmission modes carrying optical signals in each group, and transmits, to a second optical amplifier in the optical amplification apparatus for amplification, all optical signals whose modes are exchanged.

704: The second optical amplifier in the optical amplification apparatus amplifies the plurality of optical signals whose modes are exchanged.

The second optical amplifier receives the plurality of optical signals whose modes are exchanged, and amplifies the plurality of optical signals for a second time, to finally implement gain equalization for the plurality of optical signals.

705: The optical amplification apparatus outputs the plurality of amplified optical signals.

In an optional implementation, after the optical amplification apparatus amplifies the plurality of optical signals transmitted in the few-mode fiber for a second time, a sum of gains of amplifying each optical signal for two times is approximately equal to a gain threshold, and an error range may not exceed 5% of the gain threshold.

In an optional implementation, the first optical amplifier in the optical amplification apparatus receives the plurality of optical signals in the few-mode fiber, and amplifies the plurality of optical signals. After the optical signals carried in the two transmission modes in each group are amplified by the first optical amplifier, a ratio of a sum of gains of the optical signals to a target gain value does not exceed a preset precision requirement.

In an optional implementation, in an optimal amplification solution of the first optical amplifier in the optical amplification apparatus, a sum of gains corresponding to the optical signals carried in the two transmission modes in each group is equal to the target gain value.

In an optional implementation, the first optical amplifier and the second optical amplifier in the optical amplification apparatus are the same. In other words, a gain value obtained after an optical signal carried in a transmission mode is amplified by the first optical amplifier is the same as a gain value obtained after the optical signal carried in the same transmission mode is amplified by the second optical amplifier.

It should be noted that, in the method for amplifying a signal by using an optical amplification apparatus, for a design of the optical amplification apparatus, refer to the optical amplification apparatuses in the embodiments shown in FIG. 1 to FIG. 6. Details are not described again.

It should be noted that the foregoing embodiments are merely used to describe the technical solutions of this application, but are not intended to limit this application. Although this application is described in detail with reference to the foregoing embodiments, people of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. An optical amplification apparatus comprising:
  a first optical amplifier;
  a second optical amplifier; and
  a mode exchanger;
  wherein the first optical amplifier is connected to an input port of the mode exchanger, and the second optical amplifier is connected to an output port of the mode exchanger;
  the first optical amplifier is configured to amplify optical signals carried in a plurality of transmission modes, C1, C2, ..., CM, of a few-mode fiber, and gain values corresponding to the plurality of transmission modes of the few-mode fiber are respectively G1(C1)>G2(C2)> ... >GM(CM), the plurality of transmission modes of the few-mode fiber are grouped into N groups, each group comprises two transmission modes: (Ci, C(M+1−i)), and N is a positive integer greater than 1;
  the mode exchanger is configured to exchange the two transmission modes carrying the optical signals in each group, and an exchange policy of the mode exchanger is to centrosymmetrically exchange a mode Ci in gain Gi and a mode C(M+1−i) in gain G(M+1−i); and
  the second optical amplifier is configured to amplify the optical signals that are carried in the two transmission modes in each group and whose modes are exchanged.

2. The optical amplification apparatus according to claim 1, wherein a deviation between a gain value of each optical signal and a gain threshold falls within 5% after the optical signals carried in the two transmission modes in each group are amplified by the first optical amplifier and the second optical amplifier.

3. The optical amplification apparatus according to claim 1, wherein after the optical signals carried in the two transmission modes in each group are amplified by the first optical amplifier, a ratio of a sum of gains of the optical signals to a target gain value is between 0.9 and 1.1.

4. The optical amplification apparatus according to claim 3, wherein after the optical signals carried in the two transmission modes in each group are amplified by the first optical amplifier, the sum of the gains of the optical signals is equal to the target gain value.

5. The optical amplification apparatus according to claim 3, wherein a gain value obtained after an optical signal carried in a transmission mode is amplified by the first optical amplifier is the same as a gain value obtained after the optical signal carried in the same transmission mode is amplified by the second optical amplifier.

6. The optical amplification apparatus according to claim 1, wherein the first optical amplifier and the second optical amplifier each comprise a few-mode erbium-doped fiber.

7. The optical amplification apparatus according to claim 6, wherein an erbium ion doping manner of at least one of the first optical amplifier or the second optical amplifier is layered doping.

8. The optical amplification apparatus according to claim 7, wherein the first optical amplifier and the second optical amplifier each comprise at least one pump laser.

9. The optical amplification apparatus according to claim 8, wherein the first optical amplifier comprises a first pump laser and a second pump laser, and the second optical amplifier comprises a third pump laser and a fourth pump laser;
  the first pump laser is connected to a signal input port of the few-mode erbium-doped fiber in the first optical amplifier, and the second pump laser is connected to a signal output port of the few-mode erbium-doped fiber in the first optical amplifier; and
  the third pump laser is connected to a signal input port of the few-mode erbium-doped fiber in the second optical amplifier, and the fourth pump laser is connected to a signal output port of the few-mode erbium-doped fiber in the second optical amplifier.

10. A mode division multiplexing system comprising: a single-mode transmitter module; a single-mode receiver module; a mode multiplexer; a mode demultiplexer; at least one few-mode fiber; and at least one optical amplification apparatus;
  wherein the single-mode transmitter module is connected to an input port of the mode multiplexer, an output port of the mode multiplexer is connected to an input port of the mode demultiplexer through the few-mode fiber, an output port of the mode demultiplexer is connected to the single-mode receiver module, and the optical amplification apparatus is connected between few-mode fibers;
  the single-mode transmitter module is configured to: generate a plurality of paths of wavelength division multiplexing signals, and transmit the plurality of paths of wavelength division multiplexing signals to the mode multiplexer;
  the mode multiplexer is configured to: process the plurality of paths of wavelength division multiplexing signals, and generate one path of signals based on the plurality of paths of wavelength division multiplexing signals, wherein the path of signals comprises a plurality of optical signals carried in a plurality of transmission modes, C1, C2, . . . , CM, and gain values corresponding to the plurality of transmission modes of the few-mode fiber are respectively G1(C1)>G2(C2)> . . . >GM(CM);

the optical amplification apparatus comprises a first optical amplifier, a second optical amplifier, and a mode exchanger;

the first optical amplifier is connected to an input port of the mode exchanger, and the second optical amplifier is connected to an output port of the mode exchanger;

the first optical amplifier is configured to amplify the plurality of optical signals carried in the plurality of transmission modes of the few-mode fiber, the plurality of transmission modes of the few-mode fiber are grouped into N groups, each group comprises two transmission modes: (Ci, CM+1−i), and N is a positive integer greater than 1;

the mode exchanger is configured to exchange the two transmission modes carrying the optical signals in each group, and an exchange policy of the mode exchanger is to centrosymmetrically exchange a mode Ci in gain Gi and a mode C(M+1−i) in gain G(M+1−i);

the second optical amplifier is configured to amplify the optical signals that are carried in the two transmission modes in each group and whose modes are exchanged;

the mode demultiplexer is configured to demultiplex a plurality of transmission modes corresponding to one path of signals on the few-mode fiber, to obtain a plurality of paths of to-be-received signals; and the single-mode receiver module is configured to: receive the plurality of paths of to-be-received signals, and demodulate the plurality of paths of to-be-received signals.

11. The mode division multiplexing system according to claim 10, wherein in the optical amplification apparatus, a deviation between a gain value of each optical signal and a gain threshold falls within 5% after the optical signals carried in the two transmission modes in each group are amplified by the first optical amplifier and the second optical amplifier.

12. The mode division multiplexing system according to claim 10, wherein in the optical amplification apparatus, after the optical signals carried in the two transmission modes in each group are amplified by the first optical amplifier, a ratio of a sum of gains of the optical signals to a target gain value is between 0.9 and 1.1.

13. The mode division multiplexing system according to claim 12, wherein in the optical amplification apparatus, after the optical signals carried in the two transmission modes in each group are amplified by the first optical amplifier, the sum of the gains of the optical signals is equal to the target gain value.

14. The mode division multiplexing system according to claim 12, wherein in the optical amplification apparatus, a gain value obtained after an optical signal carried in a transmission mode is amplified by the first optical amplifier is the same as a gain value obtained after the optical signal carried in the same transmission mode is amplified by the second optical amplifier.

15. The mode division multiplexing system according to claim 10, wherein in the optical amplification apparatus, the first optical amplifier and the second optical amplifier each comprise a few-mode erbium-doped fiber.

16. The mode division multiplexing system according to claim 15, wherein in the optical amplification apparatus, an erbium ion doping manner of at least one of the first optical amplifier or the second optical amplifier is layered doping.

17. The mode division multiplexing system according to claim 16, wherein in the optical amplification apparatus, the first optical amplifier and the second optical amplifier each comprise at least one pump laser.

18. The mode division multiplexing system according to claim 17, wherein in the optical amplification apparatus, the first optical amplifier comprises a first pump laser and a second pump laser, and the second optical amplifier comprises a third pump laser and a fourth pump laser;

the first pump laser is connected to a signal input port of the few-mode erbium-doped fiber in the first optical amplifier, and the second pump laser is connected to a signal output port of the few-mode erbium-doped fiber in the first optical amplifier; and the third pump laser is connected to a signal input port of the few-mode erbium-doped fiber in the second optical amplifier, and the fourth pump laser is connected to a signal output port of the few-mode erbium-doped fiber in the second optical amplifier.

* * * * *